Nov. 17, 1970         D. D. BOATRIGHT, JR., ET AL         3,540,093
APPARATUS FOR MANUFACTURE OF PRESSED CERAMIC ARTICLES
Filed March 21, 1966                                11 Sheets-Sheet 8
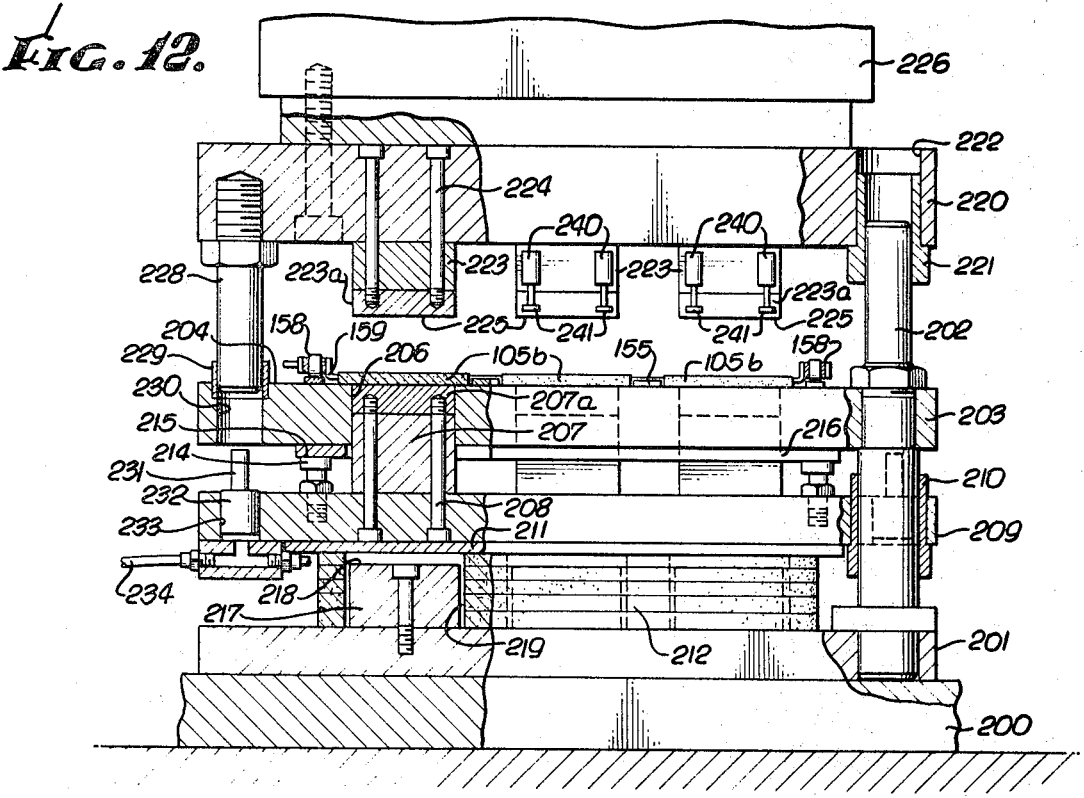
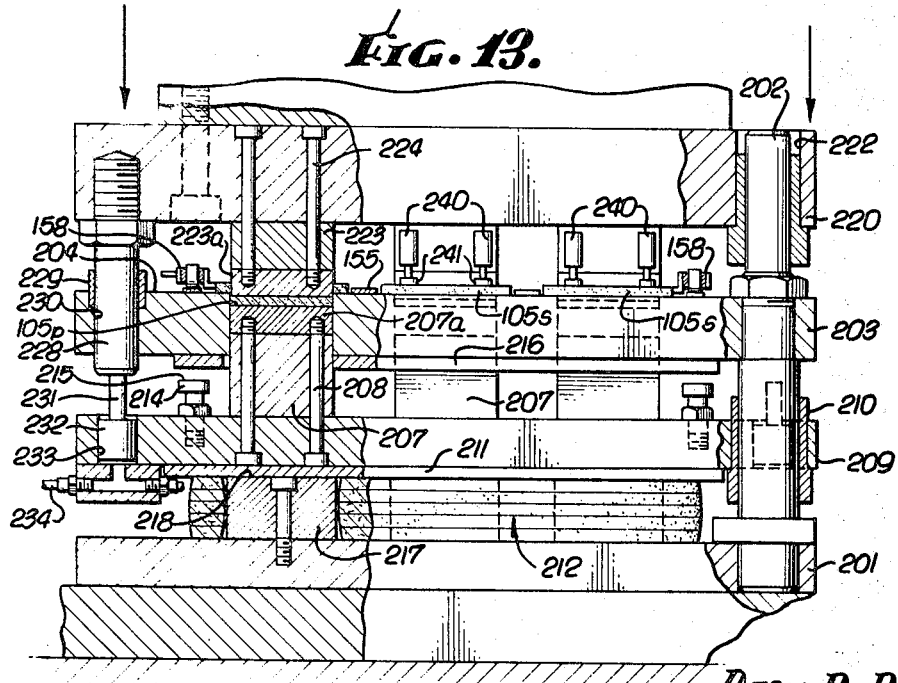
INVENTORS.
DEAN D. BOATRIGHT, JR.
LAWRENCE M. STEVENS
JAMES A. YORK
By Miketta, Glenny, Poms & Smith
ATTORNEYS.

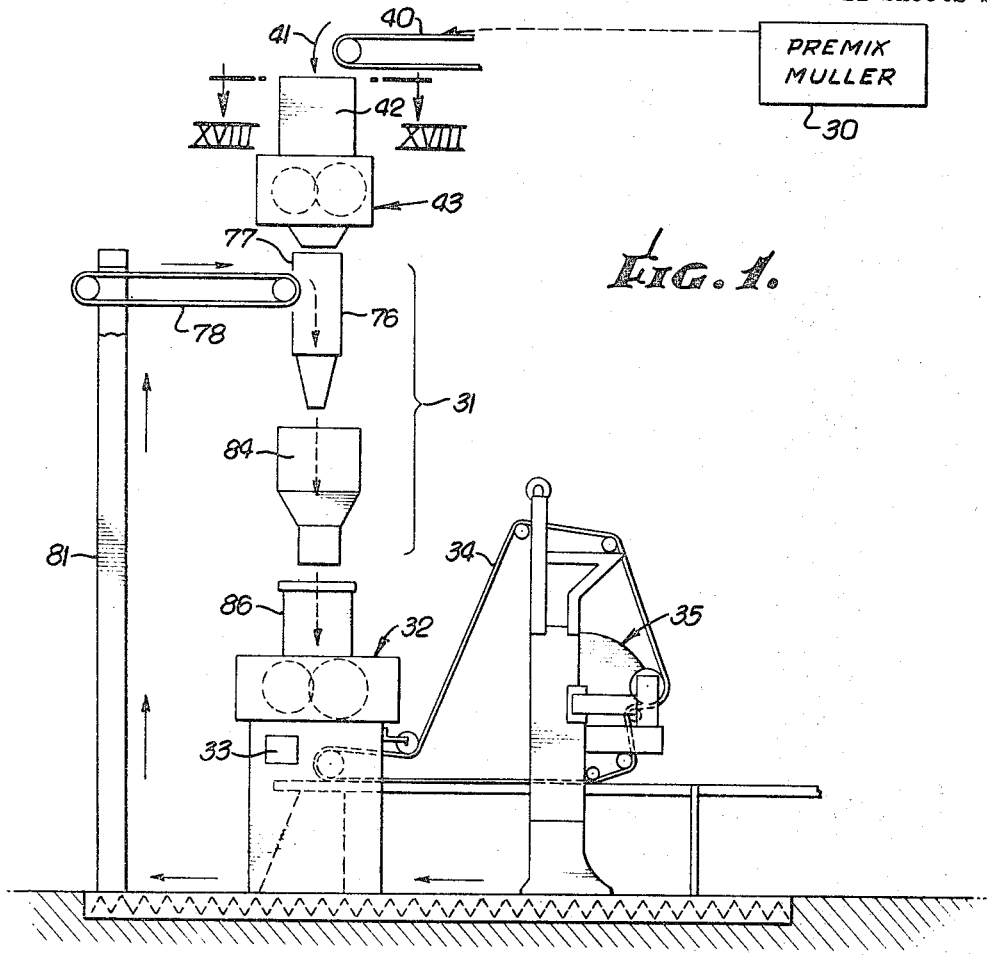
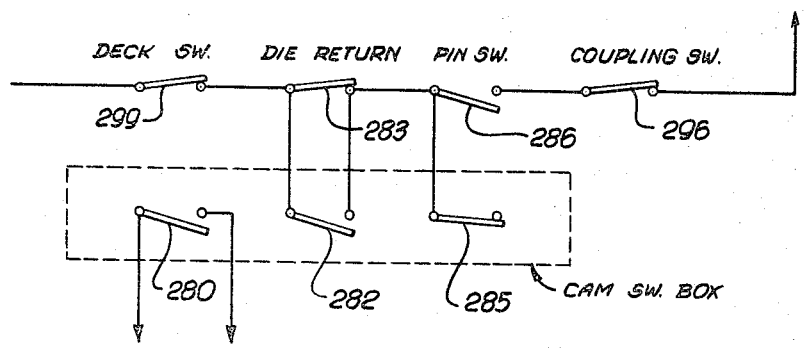

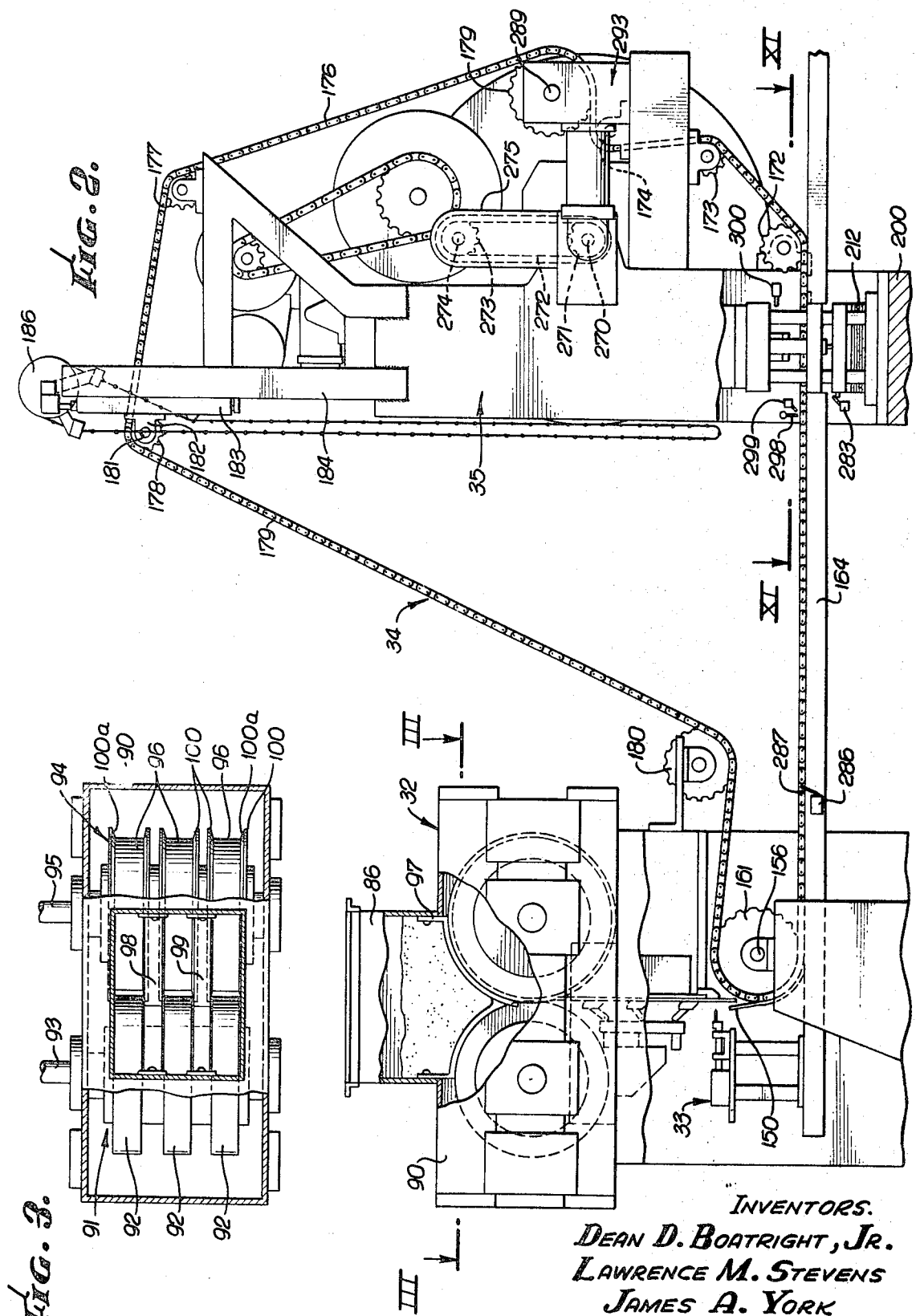

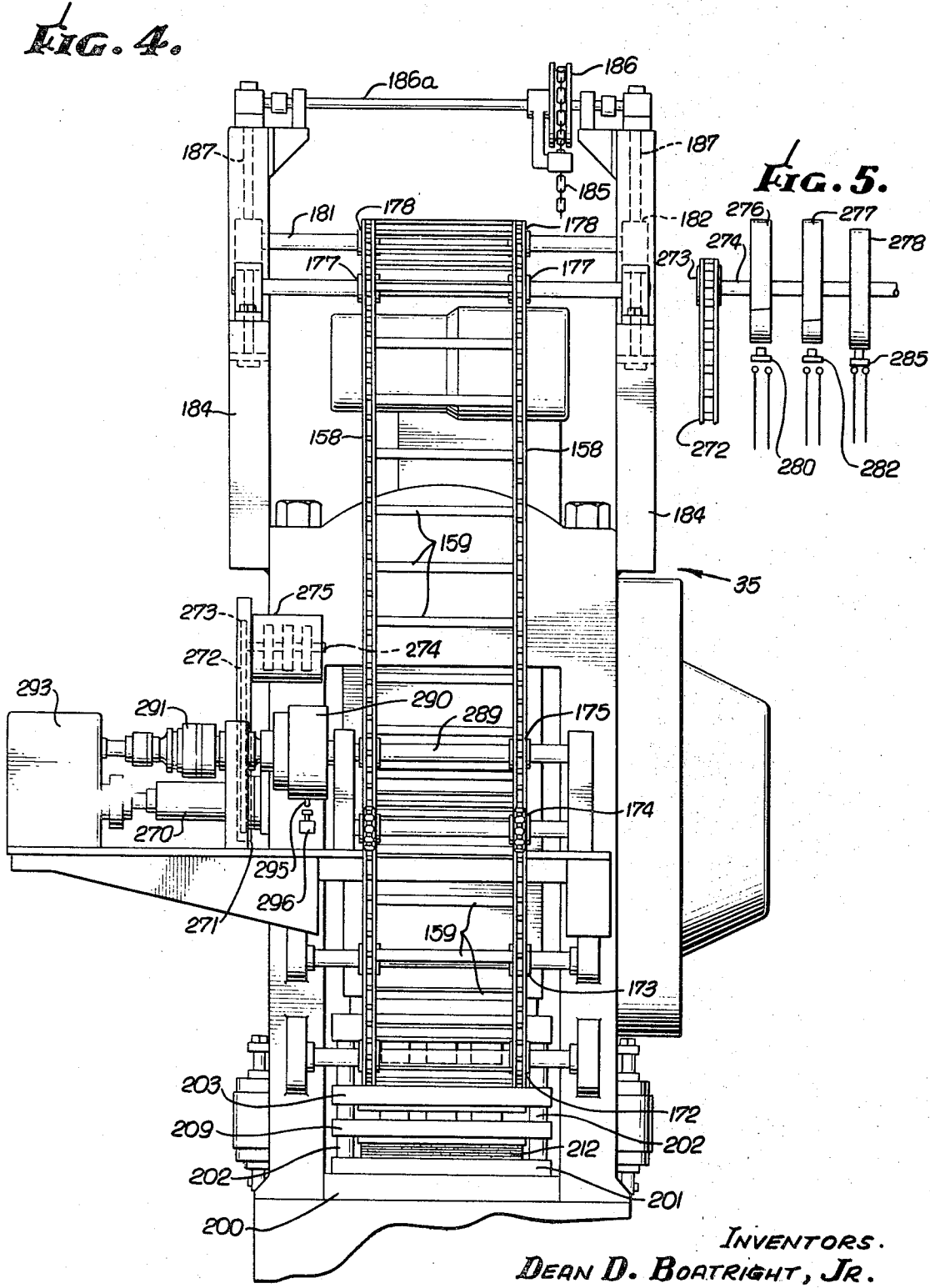

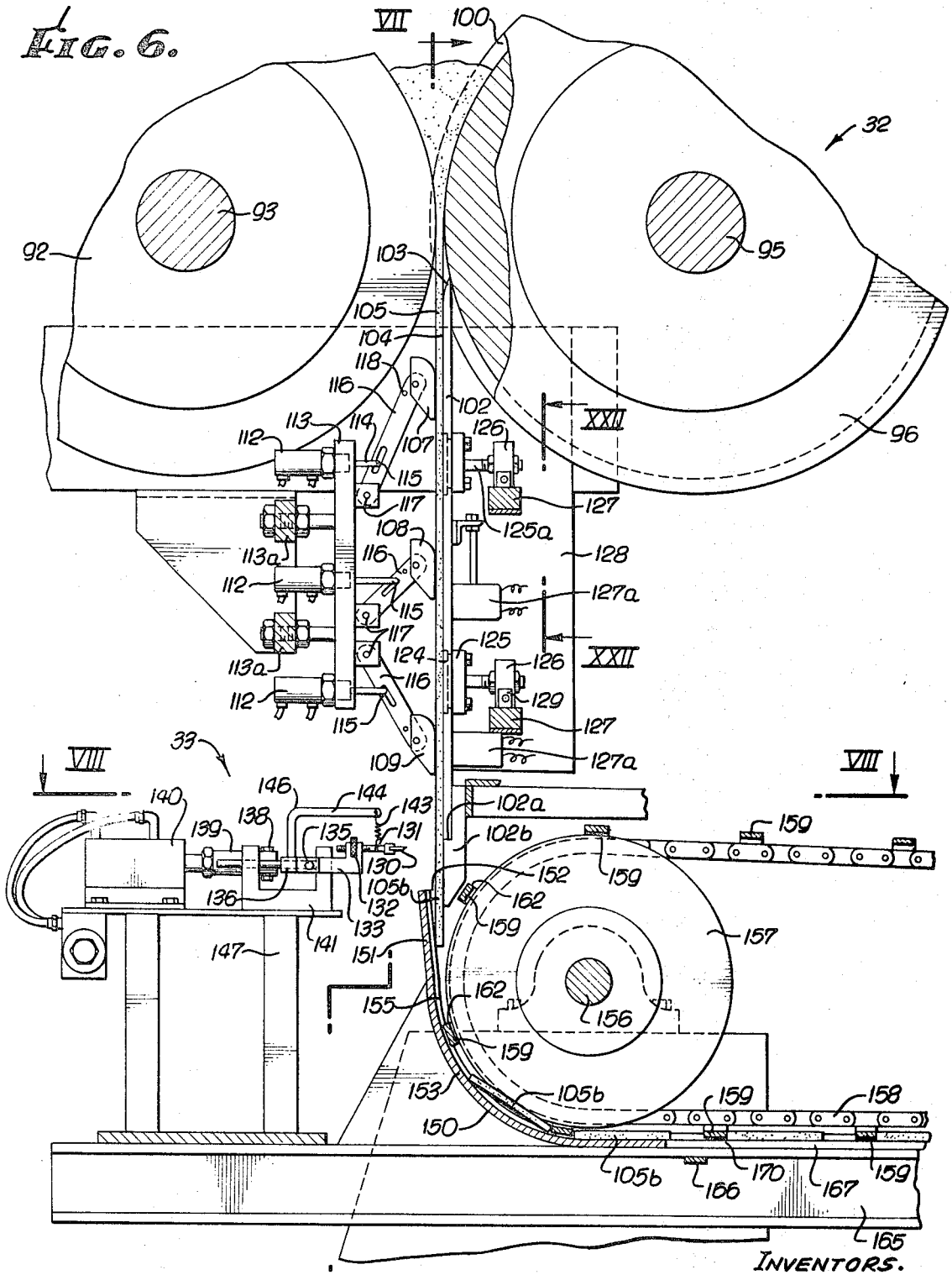

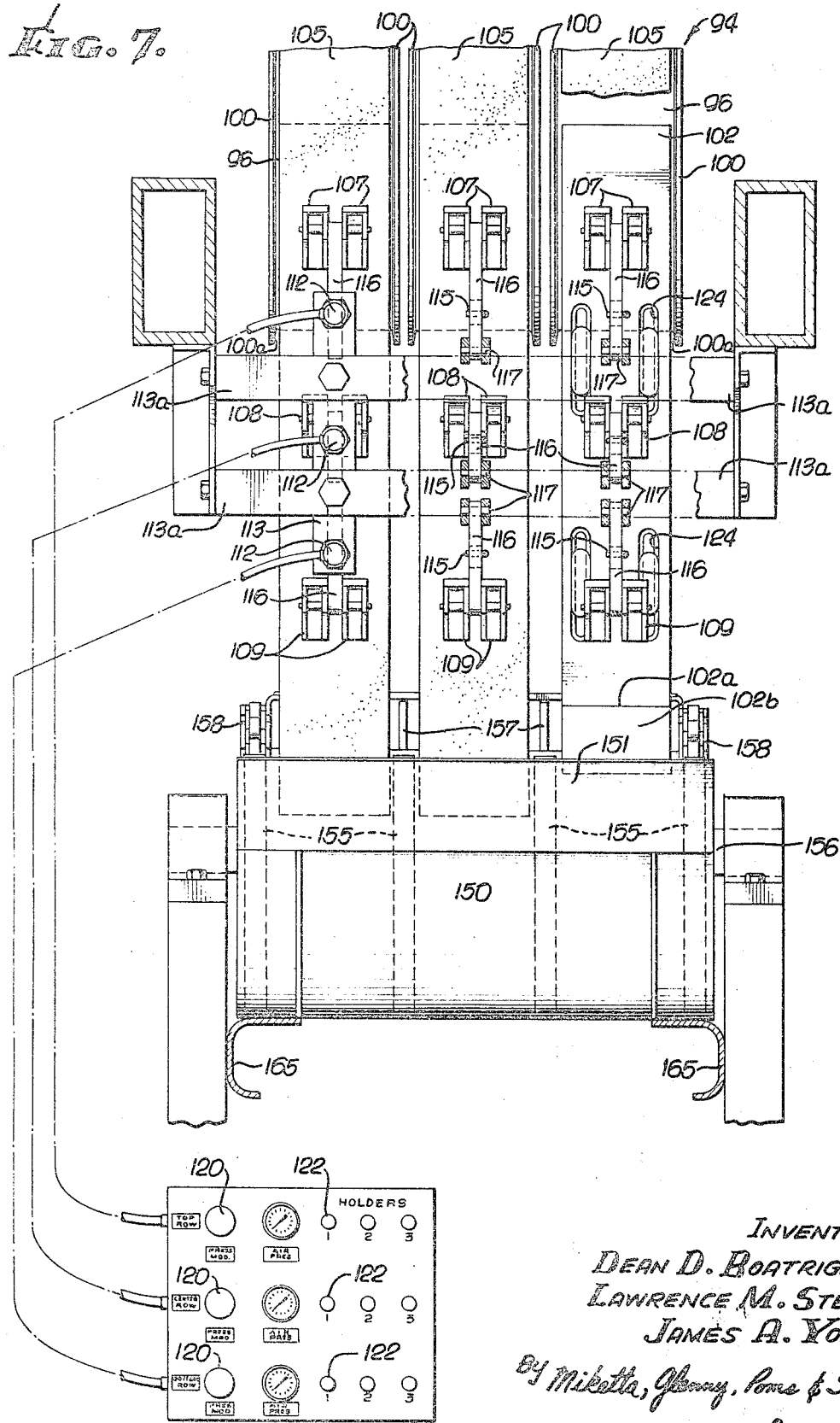

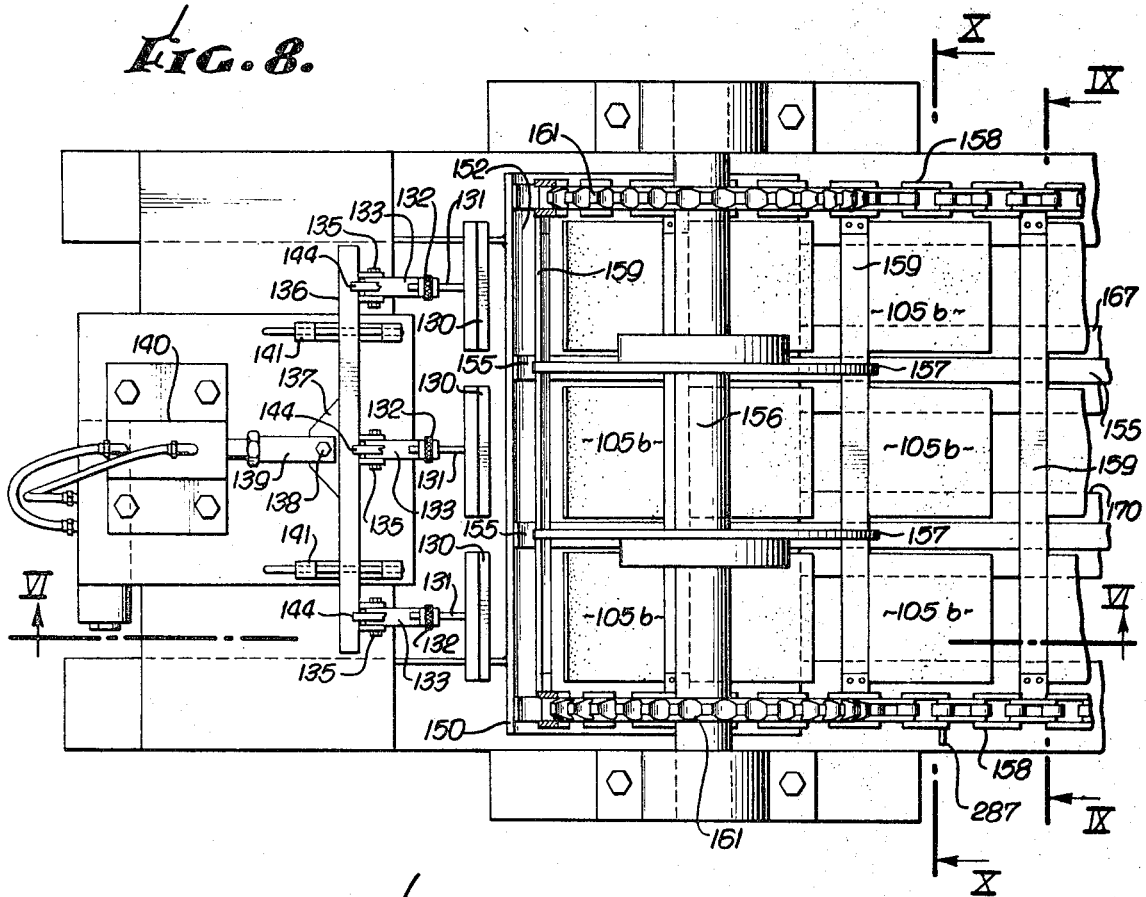
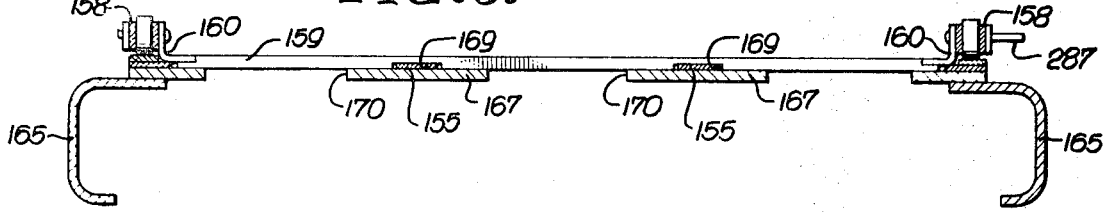
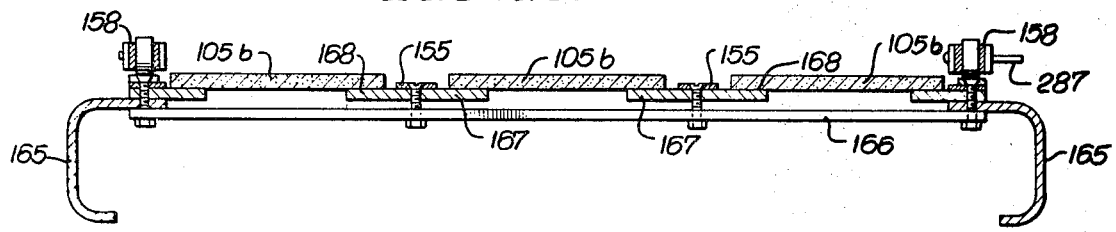

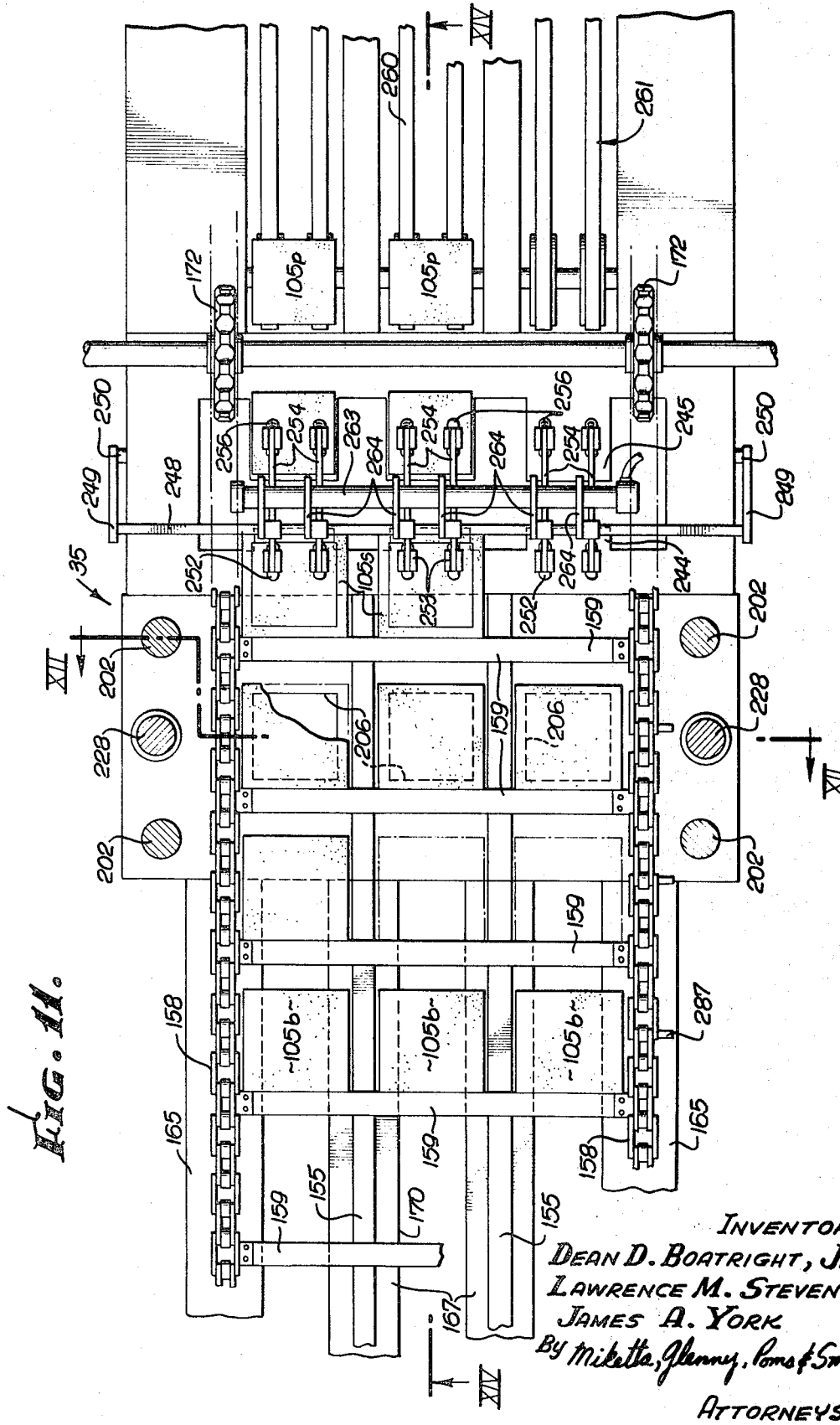

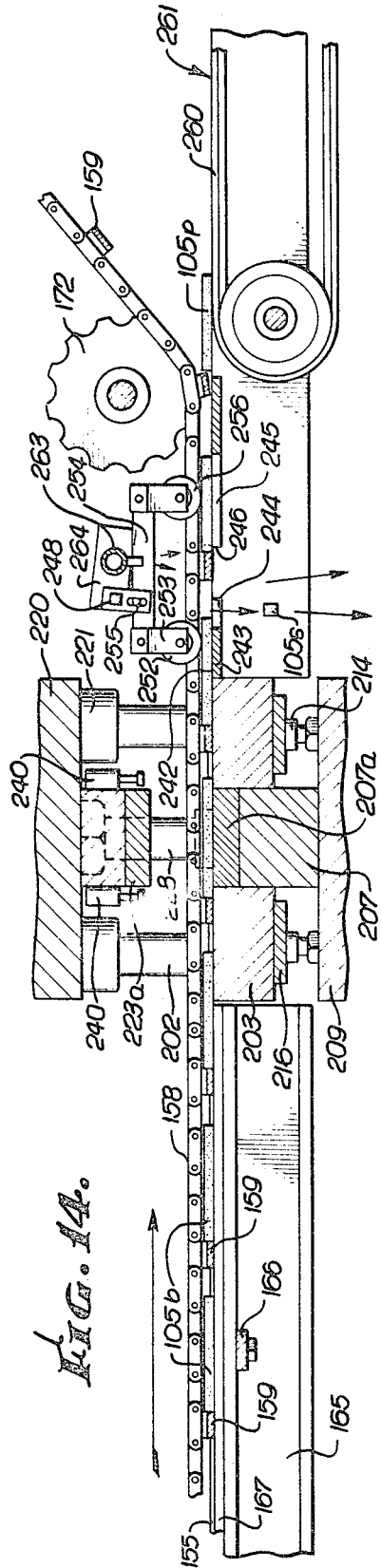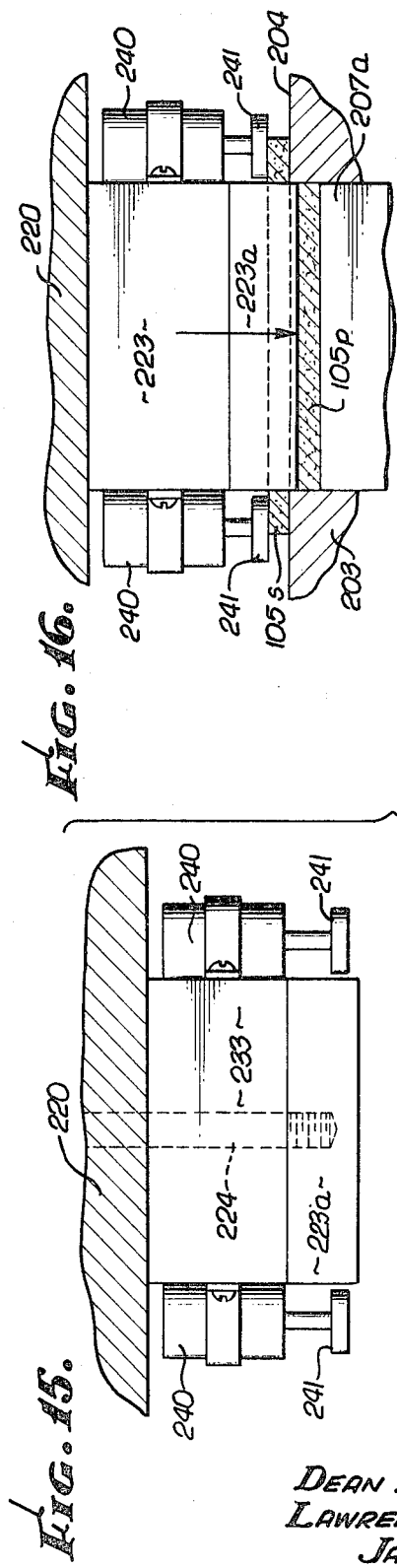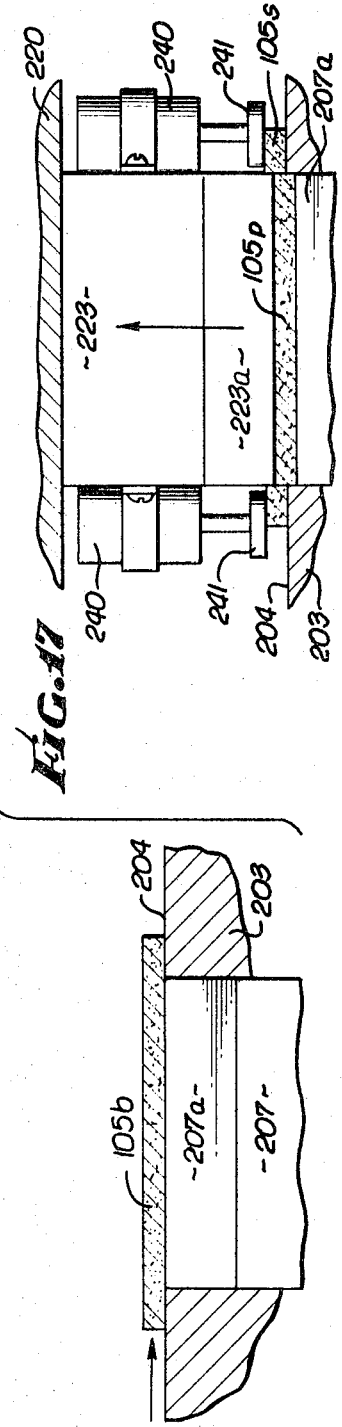
INVENTORS.
DEAN D. BOATRIGHT, JR.
LAWRENCE M. STEVENS
JAMES A. YORK
By Miketta, Glenny, Pons & Smith
ATTORNEYS.

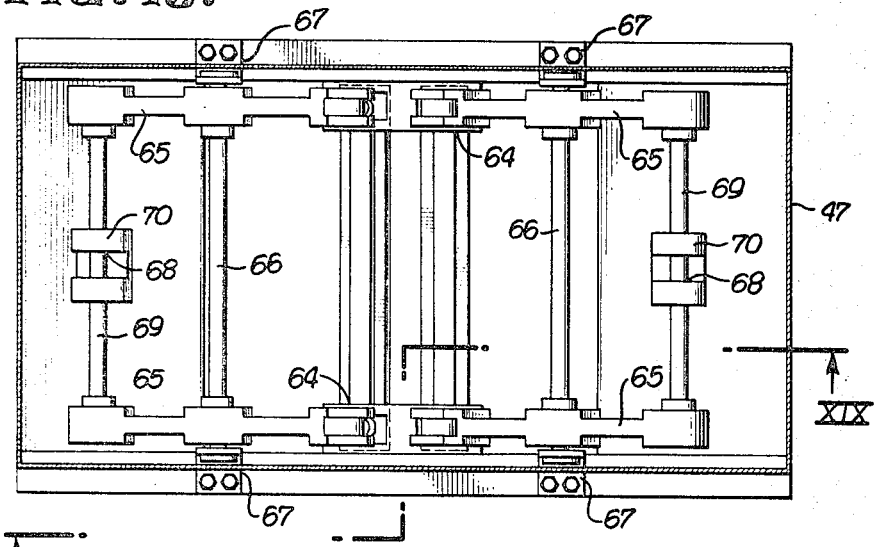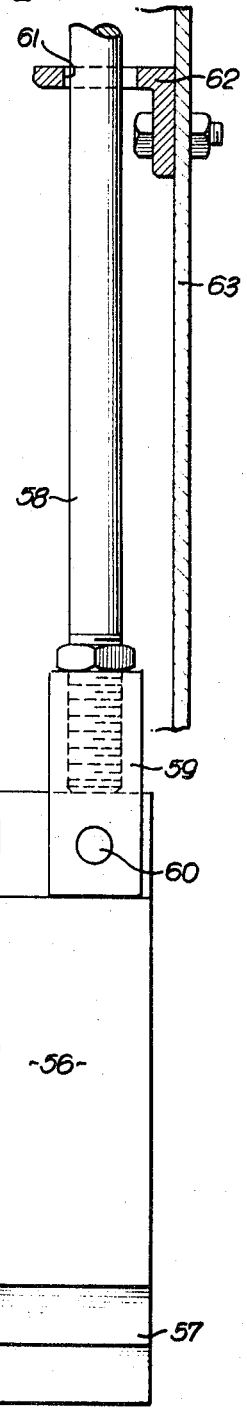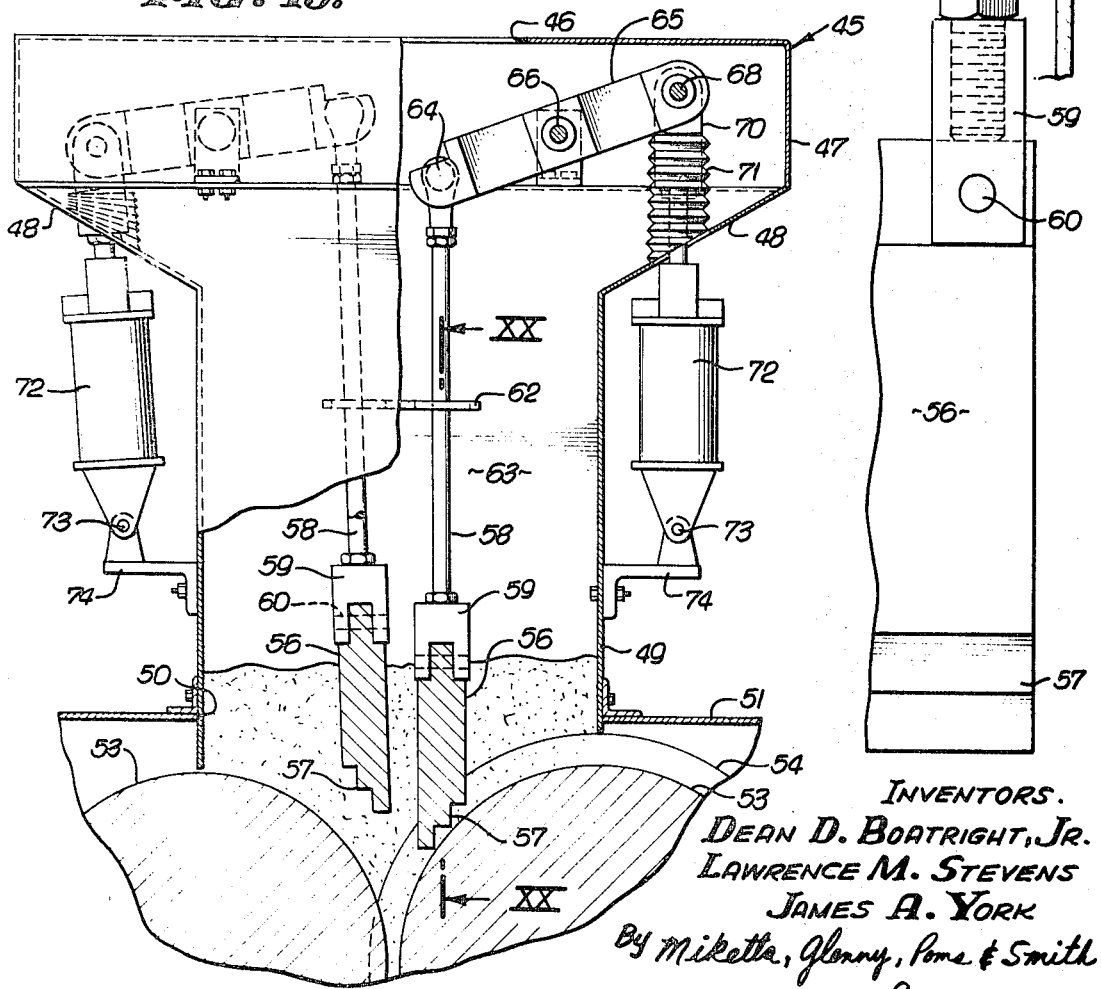

INVENTORS.
DEAN D. BOATRIGHT, JR.
LAWRENCE M. STEVENS
JAMES A. YORK
BY Miketta, Glenny, Poms & Smith
ATTORNEYS.

United States Patent Office 3,540,093
Patented Nov. 17, 1970

3,540,093
APPARATUS FOR MANUFACTURE OF PRESSED CERAMIC ARTICLES
Dean D. Boatright, Jr., Inglewood, Lawrence M. Stevens, La Crescenta, and James A. York, Glendale, Calif., assignors to Interpace Corporation, Los Angeles, Calif., a corporation of Delaware
Filed Mar. 21, 1966, Ser. No. 536,100
Int. Cl. B28b 15/00
U.S. Cl. 25—2        18 Claims

ABSTRACT OF THE DISCLOSURE

A method and means for forming a continuous coherent strip of ceramic composition material of virtually uniform homogeneity, hardness, density and thickness, transporting the strip and blanks cut therefrom along vertical and horizontal paths and pressing articles or tile bodies from the blanks.

---

This invention relates to a novel method and means for the rapid manufacture of pressed ceramic composition bodies such as wall and floor tile and other formed articles. The invention particularly relates to a novel method of handling and preparing a ceramic composition material for forming a continuous coherent, rapidly moving strip of material of virtually uniform homogeneity, hardness, density and thickness; cutting blanks of material from said continuous strip, and punch pressing from said blanks a pressed tile body having desired characteristics of hardness, density and thickness and which will maintain dimensional stability during further processing.

Prior proposed methods and apparatus for the manufacture of ceramic tile of standard size have included dry pressing a ceramic body composition in a press. The ceramic body composition is usually a substantially dry mixture of finely divided particles which are fed in free-flowing, bulk form to a press mold having the ultimate size and shape of the tile body and pressed in said mold. The pressed body is then ejected, fettled, glazed and fired. Such prior proposed methods were relatively slow, the manual feeding or filling of the press molds depended upon the skill of the operator to obtain uniform distribution of material in the mold and obviously such feeding of a dry press severely limited the speed at which the press could be operated. Dry pressing required multiple pressing to eliminate air from the powder; improper de-airing produced loss of tile.

Prior proposed methods of making pressed tile bodies also included forming of a continuous strip of ceramic composition material and cutting tile from the strip. Such prior proposed continuous strip of material was relatively thin and leathery and the nature of the body composition included relatively high percentages of water by weight in order to provide the coherency and flexibility required for handling of the thin strip. High rates of production were not attained in practice, and it was not feasible to form spacing lugs on edges of the tile body.

The present invention contemplates a novel method and apparatus for continuous, rapid production of ceramic tile of standard sizes as part of a tile manufacturing operation. The present invention contemplates automatic continuous sequential handling of a selected ceramic composition material from initial pre-mixing of such material through various process steps until the tile body is discharged from a kiln in either glazed or unglazed form. The present invention contemplates the controlled automatic handling of a ceramic composition material from the pre-mixing state in a continuous manner to the formation of a continuous moving coherent strip of such material having selected uniform hardness, density and thickness. After forming such a continuous strip of ceramic composition, the invention contemplates rapidly cutting the strip into separate discrete material blanks which may be intermittently advanced and moved to a punch press from which a tile of selected dimension is pressed from said blank. A single three cavity press can produce 4¼ x 4¼ tile at the rate of 14,400 per hour, the tile flowing as a substantially continuous stream through fettling, glaze and decoration application, dryers and kilns to storage or packing.

The main object of the present invention therefore is to disclose and provide a new method for the rapid, continuous manufacture of pressed bodies of ceramic composition material or the like.

An object of the invention is to disclose and provide a continuous method of manufacture of ceramic tile which comprise a pressed body of virtually uniform hardness, homogeneity, density and thickness.

Another object of the invention is to disclose and provide a novel method for manufacture of ceramic tile wherein a ceramic composition material is granulated to enhance characteristics of a continuous strip of material.

Another object of the invention is to disclose and provide a novel method and apparatus for cutting a continuous strip of ceramic composition material into discrete material blanks of selected length and then converting the continuous advancement of the material into an intermittent advancement of such discrete material blanks without decreasing the speed of production and flow of the continuous strip of material.

Another object of the invention is to disclose and provide a novel method and apparatus for receiving a continuous downwardly moving strip of material and guiding blanks cut from such material into a different path for advancement to a punch press.

A further object of this invention is to provide a means capable of forming a tile thinner than standard tile made by present conventional commercial tile presses.

Further objects of the invention include the provision of means and conditions for insuring the formation of a virtually homogenous, uniform blend of comminuted ceramic ingredients for the body and for feeding such body mix and converting it into a continuous strip of compacted material; the provision of novel means for cutting a continuously moving strip of ceramic body into blanks, picking them up, orienting them and moving them into position within a reciprocating press, with control means for insuring uniformity and timing; the provision of improved press means which insure rapid and accurate pressing for prolonged periods without adjustment or repair; the provision of means and methods of removing and reusing press blank scraps and thereby insuring the production of clean-surfaced tile and economical operation; and other objects and advantages which will become apparent from the description.

In the drawings:
FIG. 1 is an elevational view of an exemplary apparatus adapted to practice the method of this invention and embodying the invention.

FIG. 2 is an enlarged fragmentary side elevational view of the lower portion of the apparatus shown in FIG. 1.

FIG. 3 is a transverse horizontal sectional view taken in the plane indicated by line III—III of FIG. 2.

FIG. 4 is a fragmentary end view of the apparatus shown in FIG. 2 and taken from the right of FIG. 2.

FIG. 5 is a fragmentary enlarged view of timing cam discs shown in FIG. 4.

FIG. 6 is an enlarged fragmentary sectional view taken in a vertical longitudinal plane indicated by the line VI—VI of FIG. 8.

FIG. 7 is a sectional view taken in the vertical transverse planes indicated by line VII—VII of FIG. 6.

FIG. 8 is a transverse horizontal sectional view taken in the plane indicated by line VIII—VIII of FIG. 6.

FIG. 9 is a fragmentary transverse sectional view taken in the plane indicated by line IX—IX of FIG. 8.

FIG. 10 is a transverse vertical sectional view taken in the plane indicated by line X—X of FIG. 8.

FIG. 11 is an enlarged fragmentary sectional view taken in the transverse horizontal plane indicated by line XI—XI of FIG. 3.

FIG. 12 is an enlarged fragmentary sectional view taken in a transverse vertical plane indicated by line XII—XII of FIG. 11 and showing a tile punch press in top position.

FIG. 13 is a view similar to FIG. 12 showing the punch press in bottom position.

FIG. 14 is a fragmentary sectional view taken in the vertical longitudinal plane indicated by line XIV—XIV of FIG. 11.

FIG. 15 is an exploded fragmentary sectional view of the press die in open condition.

FIG. 16 is a view similar to 15 with the press die in closed position.

FIG. 17 is a view similar to 16 with the press die in partial release position.

FIG. 18 is a top view of a pre-compactor means for granulating the pre-mixed ceramic composition material.

FIG. 19 is a view partly in section taken in the vertical planes indicated by lines XIX—XIX of FIG. 18.

FIG. 20 is an enlarged fragmentary vertical sectional view taken in the plane indicated by line XX—XX of FIG. 19.

FIG. 21 is a fragmentary schematic view of timing and interlock switch means.

Figure 22:
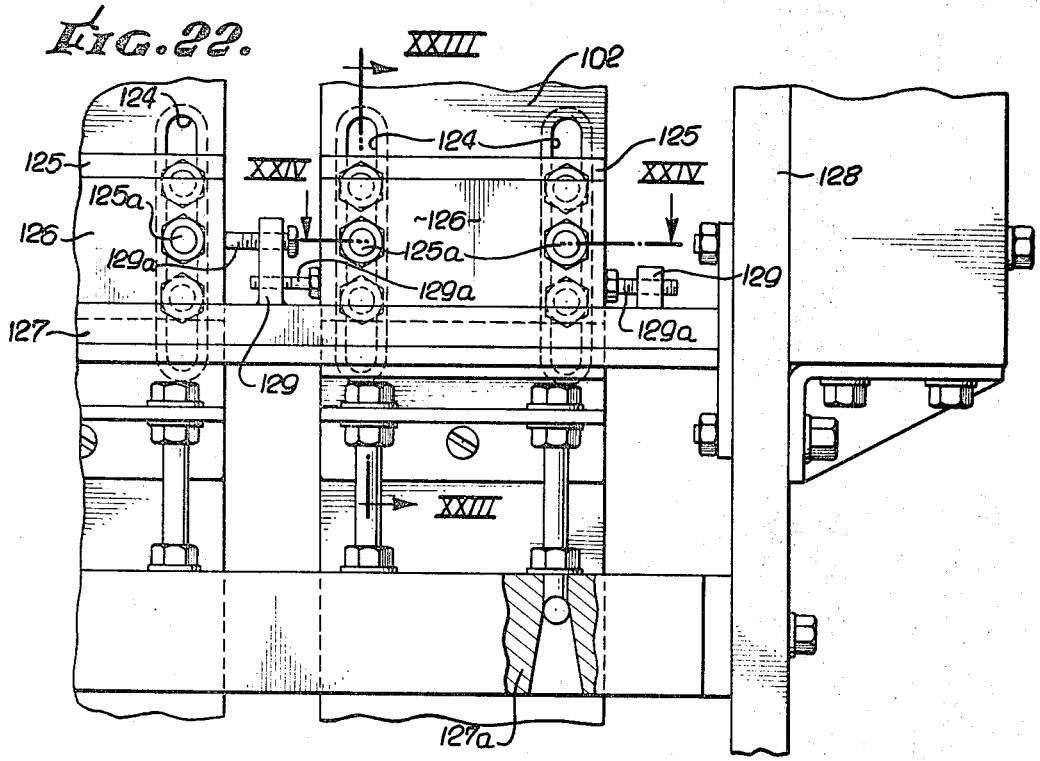
FIG. 22 is an enlarged fragmentary view taken in the vertical plane indicated by line XXII—XXII of FIG. 6.
Figure 23:
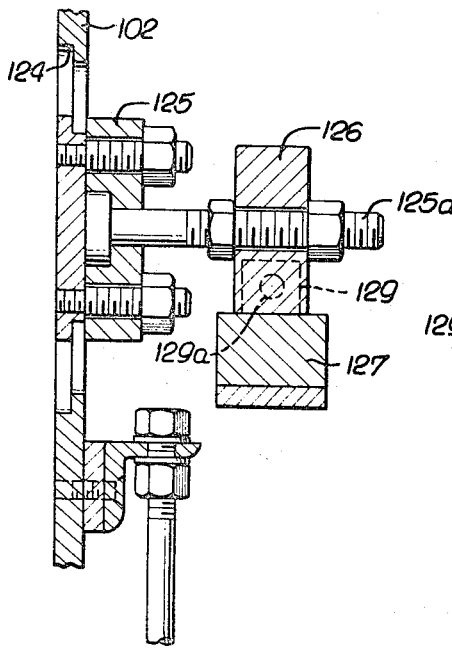
FIG. 23 is a sectional view taken in the plane indicated by line XXIII—XXIII of FIG. 22.
Figure 24:
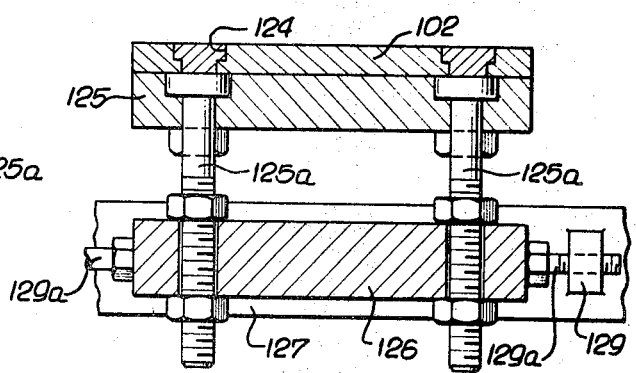
FIG. 24 is a sectional view taken in the plane indicated by line XXIV—XXIV of FIG. 22.

The method of this invention and an exemplary apparatus practicing the invention is described in relation to the manufacture of an exemplary 4¼ by 4¼ ceramic tile having a nominal thickness slightly greater than a quarter of an inch, namely about 0.275 inch. It will be understood, of course, that the method may be used for the manufacture of other ceramic articles, and the exemplary apparatus may be modified and changed while still practicing the method of the invention.

Generally speaking, in the present invention a suitable ceramic composition material is first pre-mixed in customary manner in large batch quantities. Such pre-mixed material may then be supplied by suitable conveyor means to a production line where the pre-mixed material is then granulated as by pressure feeding said material between compression rolls and by pulverizing and screening the compressed body discharged from the compression rolls. The screened particles of selected size as later described are then fed to a hopper which feeds by gravity the granulated composition material to a pair of horizontally disposd strip forming rolls from which a continuous coherent pressed strip of ceramic composition material is discharged in a vertical downward direction and is of virtually uniform hardness, density, thickness and width. Such continuous strip is guided and supported during such downward vertical movement to maintain its integral continuous character while preventing fractures due to longitudinal tension forces acting on the strip during such movement. Scrap material resulting from excess material trimmed during a later pressing operation is collected and returned to the flow of granulated, pre-mixed material at a point just before the step of pulverizing and screening the pre-mixed roll pressed material. The method of the invention contemplates controlling moisture of the pre-mixed material at the strip forming rolls within a selected range for a selected ceramic composition material so that the continuous rolled strip of material may be rolled without difficulty, be of selected hardness, and avoid development of laminations and tile surface blisters.

The continuous flow of material from pre-mixing to the forming of a continuously moving strip of material is then modified or converted to a rapid intermittent motion or advancement of sections or blanks of the composition material from which a tile body is to be made. After the continuous strip of material is dicharged from the strip forming rolls in a vertical downward direction, the strip is cut into successive material blanks as by intermittent timed actuation of horizontally movable cut-off means. Material blanks separated from the formed strip continue to move downwardly by gravity and are almost immediately placed in and received by an intermittently actuated slat-like chain transfer conveyor or carrier and guide member which change such downward motion of the blank to a horizontal intermittent motion. The separate material blanks are then advanced along a tile deck by intermittent motion of the transfer carrier to a punch press where a die punches and presses an article, such as a tile from the material blank. The virtually simultaneous intermittent actuation of the press, transfer carrier and cut-off means are correlated in selected timed relation with the rate of discharge of the continuous strip of material, the material blank being adjusted to a selected length. Upon pressing a tile of selected size and thickness from each material blank, the unpressed peripheral margins, trim or flashing of the material blank are removed and returned by a suitable conveyor system as scrap material to be introduced in selected quantity into the premixed composition material as hereinbefore mentioned. After individual tile are thus pressed, they are advanced for further processing such as fettling, drying, spraying with a selected glaze composition and may be fired in a suitable kiln, such processing being accomplished in a virtually continuous automatic manner.

The method of the invention generally described above lends itself to the supply of pre-mixed ceramic composition material to one or more production lines, each of which may punch press in the order of 120 to 240 tile per minute. In the present example, only one production line which includes the forming of three continuous rolled strips of composition material is described inasmuch as each of the other production lines may be substantially identical. Different size and shape of tile may be made in the other production lines.

The method of the present invention will be described with respect to an exemplary apparatus for manufacture of such ceramic composition articles in rapid manner. In general, such apparatus (FIG. 1) may comprise a mulling mixer 30 for pre-mixing a ceramic composition material, a granulating means 31, a roll means 32 for forming three rolled strips of composition material, a cut-off means 33 to cut and separate from each of said continuous strips a blank of material of selected length, a slat-like chain transfer carrier means 34 for intermittently advancing the separate material blanks, and a punch press means 35 for pressing from each material blank a tile body of selected dimensions. Apparatus for fettling the pressed tile bodies, for conveying the fettled tile bodies to an oven for drying, for spraying the dried bodies with a selected glaze, and then firing the sprayed tile bodies in a kiln are not shown.

PRE-MIXING

Pre-mixing of a suitable ceramic composition material may be conducted in well-known manner. Any suitable ceramic composition material for a tile body may be employed and an exemplary ceramic composition material may include desired proportions of clay, talc, whiting and dolomite. An example of a suitable tile body mix and the proportions therefor may be clay 40%, Holiday Talc 13.3%, Desert Talc, 26.7%, whiting 11.1%, dolomite 8.9%. Such material may be mixed in a mulling machine 30 for a selected length of time, such as 45 minutes. In such mixing at the mulling machine, moisture may be added to the material as by controlled spraying in order to obtain a desired material moisture in the material fed to the strip forming rolls and to compensate for moisture lost between the pre-mixing machine and the strip forming roll means 35. At mulling mixer 30 it has been found desirable, under normal local conditions of ambient temperature and humidity, to maintain the moisture within about 6.0%, to 7.0% by weight of the exemplary material in order that the material moisture in the hopper above the strip forming rolls 35 is maintained in the order of about 5.0% to 6.0% by weight.

After a batch of ceramic composition material has been pre-mixed as above described in mulling machine 30, the mixed material may be transported by suitable elevator and conveyor means to granulating means 31. In this example, the pre-mixed material from the mulling mixer 30 is moved on an endless belt conveyor 40 which discharges the pre-mixed material at 41 into an opening in housing 42 of a material compactor or tamping means 43.

GRANULATION

In the present invention, granulation comprises subjecting the pre-mixed material to compaction or tamping forces for eliminating air therefrom while it is being fed between a pair of pressure rolls from which it is discharged as a compressed body, then disintegrated or pulverized, and then screened so that particles of selected size are fed to the hopper above the strip forming rolls.

Tamping means 43 is best shown in detail in FIGS. 18–20. In FIG. 19, a hollow hopper housing 45 may have an opening 46 in its top wall to receive discharge of material from conveyor 40. The housing 45 may include an enlarged rectangular top housing portion 47 provided with downwardly inclined end walls 48 which join with the end walls of a generally reduced rectangular in cross-section bottom housing portion 49. Bottom housing portion 49 extends into an opening 50 formed in the top wall of a roll housing 51, which encloses a pair of horizontally disposed compression rolls 53. One roll 53 may be provided with end flanges 54 which overlap the end faces of the adjacent roll 53 so as to contain the pre-mixed material between the faces of the rolls as the material is pressed therebetween. Means for driving rolls 53 at variable selected speeds is provided and is not shown since such drive means is well known. It should be noted that walls of bottom housing portion 49 fit relatively closely to the surfaces of the rolls 53.

Within the bottom housing portion 49 is provided a pair of alternately reciprocally actuated horizontally extending tamping bars 56 positioned just above the bite of the rolls 53. Each bar 56 extends for the length of a roll 53 and has a stepped bottom edge 57 facing the adjacent roll 53 to compact material against the face of the roll 53 as the roll turns. The stepped faces 57 on the bars 56 are oppositely directed so that as the rolls turn and the bars 56 alternately reciprocate toward and away from their adjacent rolls a quantity of tamped material will always be presented to the bite of the rolls.

Each bar 56 may be carried by a pair of end rods 58 each threadably adjustably secured at its bottom end to a yoke 59 secured by a pin 60 to an upper rabbeted corner portion of bar 56. Each rod 58 extends through a guide opening 61 provided in an angle bracket 62 secured to side wall 63 of bottom housing portion 49. At its top end, each rod 58 may be pivotally connected as at 64 to one end of a rocker arm 65 pivotally mounted between its ends about a transverse rod 66 having its opposite ends seated in bearing brackets 67 secured to the side wall of the top housing portion 47. The opposite end of each rocker arm 65 may be pivotally connected at 68 to a transverse rod 69 to which the upper end of a piston rod means 70 may be connected. Piston rod means 70 includes an expansible bellows-type dust protective cover 71. The piston rod means 70 extends through the inclined end wall 48 and is connected with a double acting fluid actuated (air) cylinder means 72 pivotally connected at its bottom end at 73 to a bracket 74 secured to the adjacent end wall of the bottom housing portion 49.

In operation of tamping means 43, the fluid actuated cylinders 72 are alternately operated at a selected rate of speed and with a selected fluid pressure so that tamping bars 56 will reciprocate in the space just above the bite of rolls 53, will tamp the pre-mixed material against the turning surfaces of rolls 53 and will thus present to the bite of the rolls a tamped or compressed quantity of composition material. The tamped force-fed material is further compressed by rolls 53 and is discharged as a pressed sheet-like body. Modifying pressure exerted by cylinders 72 through the tamping bars 56 on the composition material controls and regulates the bulk density and hardness of the material discharged. When air pressure is increased the material discharged from rolls 53 will be harder. Modifying the size of the opening between the rolls 53 will also modify the condition of the material discharged therefrom, for example, reduction of the size of the opening between the rolls 53 will provide a harder and thinner granulating strip.

Referring again to FIG. 1, material discharged from the tamping means 43 flows by gravity into a transfer hopper 76. In addition to the top opening provided in transfer hopper 76, hopper 76 may be provided with a side opening 77 through which may be fed by a suitable conveyor means 78 scrap material which has been collected from rolled material blanks between the roll press 32 and the punch press 35. Such scrap material has already been passed through the granulation means and further compacting or tamping of the scrap material is normally not necessary. In FIG. 1, the scrap material may be returned by a bottom screw conveyor 80 which advances the scrap material to an elevator 81 which will discharge the material upon the conveyor 78. It may be desirable in the scrap return line to provide a pulverizing mill for initially reducing the scrap material to a predetermined selected particle size and range. The amount of scrap material returned at any one moment to the main flow of pre-mixed composition material depends upon the characteristic and condition of the pre-mixed material and the scrap material since it is desirable to introduce to the roll press means 32 a composition material having a predetermined moisture content, bulk density, particle size range, and hardness.

Material discharged from the transfer hopper 76 then flows by gravity through the top opening of a pulverizing or disintegrating mill 84. Mill 84 may be of well-known manufacture and may include pre-breaker means to first break the material into coarse particles and then milling means such as a plurality of hammers or preferably knives to further break up the material into a selected particle size and range. Desirable granulation particle size lies between 8 mesh to 100 mesh and an exemplary size range is set forth below.

| | Percent |
|---|---|
| +8 mesh | 0–2 |
| −8+28 mesh | 30–48 |
| −28+48 mesh | 15–22 |
| −48+65 mesh | 3–7 |
| −65+100 mesh | 5–10 |
| −100 | 22–34 |

The pulverizing machine 84 may be equipped with an 8 mesh wire screen in order to limit maximum particle size, although with certain material mixtures, screens of larger mesh may be employed. The pulverizing machine 84 thus discharges a selected particle size and range to a suitable storage bin 86 from which the granulated material may be fed to the roll press machine 32.

STRIP FORMING

Such granulated composition material which has selected particle size and a moisture content of between 5–6% by weight may now be formed into a continuous integral coherent rolled strip of composition material. It is desirable that such a continuous strip of composition material have a uniform density, hardness, width, and thickness. For the purposes of making a 4¼" x 4¼" ceramic tile of standard thickness, such as 0.275" it is desirable that the rolled strip thickness be between .290 to .300 inch, and have a Shore "B–2" hardness of 45 to 55. In addition the material moisture in the hopper above the strip rolls should preferably be maintained between 5.0–6.0% by weight for the exemplary composition material mentioned above.

The strip forming roll means 32 may be best seen in FIGS. 2, 3 and 6. Roll means 32 may comprise a roll housing 90 of generally rectangular section and provided with a top opening for gravity flow of granulated material therethrough. An anvil roll means 91 may include three axially spaced anvil rolls 92 of selected width and mounted on a driven shaft 93 through suitable bearing means. A flange roll means 94 is disposed with its driven shaft 95 parallel to shaft 93 and includes three correspondingly spaced flanged rolls 96. The shafts 93 and 95 are horizontally spaced apart so that the outer cylindrical surfaces of the anvil and flanged rolls 92, 96 will be spaced apart a selected distance, such as .300 inch, for passage therethrough under pressure of the granulated composition material. Suitable variable drive means (not shown) are provided for roll means 91 and 94 so that the rolled strips of material are discharged therefrom at an adjustable rate of speed.

To guide the granulated material into the spaces provided between the anvil and flanged rolls, a suitable rectangular fitting 97 having three parallel openings aligned with rolls 92, 96 is provided at the bottom of hopper 86. Fitting 97 has arcuate wall portions 98 and 99 extending downwardly into the bite of rolls 92 and 96 and in close proximity thereto. Thus material flowing downwardly by gravity through hopper 86 is channeled into the three openings and will be directed into three separate spaced streams of material to pass between rolls 92, 96. Fitting 97 further acts as a space filler to prevent material from dropping between or outwardly of the rolls 92, 96.

To further control the material which is pressed between rolls 92, 96, each flanged roll 96 is provided with radially outwardly directed circumferential edge flanges 100 which define therebetween an annular space for reception of the peripheral surfaces of anvil roll 92. Distribution of granulated material across the space between flanges 100 on each roll member 96 is accomplished by gravity feed of such material. Flanges 100 may extend from the cylindrical surface of the roll member 96 a distance about 2½ times the thickness of the strip to be formed to limit spillage and to provide uniform hardness across the strip. As an example, if the strip to be formed is to have a thickness of about .300 inch, the depth of the flanges should be about .75 inch. The internal face 100a of flange 100 may be tapered or inclined about 3°. In addition, the anvil roll may be contoured on its cylindrical surface with a slight transverse concavity in the order of 0.010" to provide a slight amount of additional material in the central portion of the strap. The combination of the height and taper of flange face 100a and the concavity of the anvil roll surface provides distribution of rolled material across the strip which is of virtually uniform hardness and density.

Granulated material accumulated in the hopper 86 flows by gravity into the solt-like openings of fitting 97 and is compressed by the rolls 92, 96 into three continuous coherent strips of material. In the present example, the width of the strip formed between the flanges 100 may be approximately 5 inches and each 5 inch strip may have a thickness of approximately .300 inch.

Rolls 92 and 96 may have a diameter of about 26 inches, it being understood that increasing the diameter of the rolls tends to increase hardness of the strip being rolled.

Because of a tendency of the rolled strip 105 to follow the roll surface of a flanged roll 96, a scraper or take off bar 102 having a beveled top edge 103 may be positioned with the beveled edge lightly contacting the peripheral surface of roll 96 between the flanges. The scraper bar 102 presents a flat, planar vertical surface 104 against which the formed continuous strip 105 may slide as it moves vertically downwardly. Such vertical downward discharge of strip 105 is relatively friction free, imparts no bending forces to the strip, and when the strip is formed from granulated material as above described, the speed of travel of the formed strip may be, for example, 300 inches per minute.

Means for guiding the continuous strip 105 as it moves in a vertical downward path from the strip forming rolls may comprise a plurality of vertically spaced rows of pairs of pressure members such as shoes 107, 108 and 109, each shoe 107, 108 and 109 of each pair having a flat, smooth surface bearing against the face of strip 105 opposite to surface 104 on scraper bar 102. By suitable selective application of pressure to shoes 107, 108 and 109, the strip 105 is sufficiently supported by lateral pressure so that fracture of the continuous strip will not occur because of tension forces acting on the vertical strip due to downward movement and gravity.

Means for selectively applying pressure to the several rows of shoes 107, 108, and 109 may comprise a fluid actuated cylinder means 112 for each pair of shoes in each row and carried on a suitable transverse frame 113 which may be adjustably mounted on transverse members 113a for movement toward and away from the path of strip 105. Each cylinder means 112 may include a piston rod 114 having at its outer end a slidably movable pin and slot connection 115, the slot being provided in an arm 116 pivoted at 117 to frame 113 and at its opposite end carrying pivotally mounted pair of shoes such as 107. To prevent mispositioning of shoes 107, 108 and 109 beyond a certain angular relationship with strip 105 and with the arm 116 which might cause damage to the strip, a stop element 118 or other suitable means may be provided on arm 116 to limit such movement. Thus pivotal movement of shoes 107, 108, 109 is controlled and upon actuation of cylinder means 112 the shoe surfaces will be properly disposed for sliding contact with the face of strip 105. Pressure shoes or members 107, 108, 109 may also include freely rotatable wheels or other forms of slidable pressure applying means.

Means for actuating each of the cylinder means 112 for each row of shoes 107, 108 and 109 is only schematically shown and may comprise a suitable fluid actuated system having a suitable supply source of pressure fluid such as compressed air. The cylinder means 112 of each row of shoes 107, 108 and 109 are connected to a common pressure line or manifold so that the pressure of the shoes in each row will be approximately the same. Pressure may be readily modified by changing the pressure air through a pressure control valve 120 for each row. A suitable panel supporting control valve 112, a pressure indicator gage for determining the pressure in each row, and separate control valves 122 for relieving pressure on any one pair of shoes in a row is also schematically shown.

It will thus be apparent that immediately opposite the scraper bar or plate 102, pressure holding means maintain continuity of the continuous strip of material by application of suitable lateral pressure to the strip and that the rows of pressure shoes are spaced sufficiently close so that during the relatively free downward movement of the strip of material 105 separation, breaking apart, or fracture of the strip of material will not occur.

Each scraper plate 102 may be mounted for precise adjustment with the cylindrical surface of the flange roll 96. Means for vertical, lateral and front to rear adjustment of plate 102 may comprise vertically spaced pairs of parallel T-section slots 124 in plate 102, each slot receiving an elongated T-section retainer head assembly 125 of shorter length than slot 124 and longitudinally movable therein to vertically position plate 102. Retainer head assembly 125 may carry a rearwardly extending support bolt 125a which threadedly engages a transversely adjustable holding block 126 laterally secured by bolts 126a on transversely extending rack members 127 fixed at their opposite ends to frame members 128. Bolt 125a affords front to rear adjustment of the plate 102. Upstanding lugs 129 fixed to rack members 127 may carry threaded bolts 129a which abut at one end the opposed end face of adjacent block 126. Bolts 129a laterally position block 126 and thus plate 102.

The plate 102 includes a bottom portion seated on a shoulder 102a of a strike or anvil plate 102b fixedly secured to a transverse frame member. Thus scraper plate 102 is not secured to strike plate 102b and may be placed under some stress by bolts 125a when the beveled edge 103 is in contact with roll 96 and the bottom portion of plate 102 is only seated on shoulder 102a. Plate 102 is thus held under stress and against vibration when the cut-off means forcibly strikes strip 105 opposite the fixed anvil plate 102b. Thus the continuously moving strip 105 which is being slightly laterally held against face 104 of the plate 102 is protected against vibration or shock forces caused by the cut-off means severing strip 105.

Suitable electrically energized heating means 127a may be positioned against the back face of plate 102 at spaced vertical locations and may be supported from adjacent rack members 127 by suitable susension bolts and heater holding members. The heating means 127a serve to heat plates 102 to reduce tendency of strip 105 to stick to surface 104 when under lateral pressure by shoes 107, 108, 109.

CUT-OFF MEANS

Immediately below the bottom row of shoes 109 the continuous coherent strip of material is cut into successive, separate material blanks 105b during such vertical downward travel. Each blank has the same width as the width of the strip and has a length greater than the length of a tile to be thereafter pressed. For example, for a 4¼ by 4¼ pressed tile, the dimensions of the material blank may be 5 by 5 inches.

Cut-off means for successively rapidly fracturing each continuous strip of material 105 at selected intermittent intervals of time may comprise a single row of three laterally spaced horizontally disposed cutting blades 130 (FIGS. 6, 8). Each blade 130 includes a support rod 131 adjustably mounted by nut means 132 so that the edge of the blade may be selectively spaced from the face of strip 105. The nut means 132 is carried by a forwardly extending arm 133 pivotally mounted about a horizontal axis 135 and supported from a transversely extending bar 136. At its central portion bar 136 carries a rearwardly extending plate 137 which provides a pivotal connection 138 with the front end of a piston rod extension 139 of a double acting fluid actuating means 140.

Means for limiting forward and backward travel of the transverse bar 136 may comprise a pair of upstanding U-shaped members 141 positioned adjacent to and receiving therein opposite ends of bar 136. To maintain the knife blades 130 in a selected horizontal position, a spring means 143 may be attached at one end to each rod 131 of a knife blade 130 and attached at its other end to a forwardly extending arm 144 of an angle-shaped member 146 supported from the bar 136.

Upon actuation of the cut-off means the cylinder means 140 rapidly and sharply moves the three knife blades 130 forward and partially into the descending continuous strip 105. Each blade may only partly penetrate the thickness of strip 105, the sharp impact blow delivered by each knife blade fracturing the remaining material thickness of the strip. The three blades strike the strip virtually simultaneously. Since each of the blades is pivotally mounted for vertical movement and is resiliently supported in horizontal position, the blades may move downwardly with the strip upon contact therewith and are then rapidly retracted from the strip. Actuation of the cut-off means is in timed relation with the press and transfer carrier means as later described.

SLAT-TYPE CHAIN CARRIER MEANS

Referring again to FIG. 6 and also to FIGS. 8, 9 and 10, transfer carrier means 34 is arranged to successively receive a falling material blank 105b immediately after a blank 105b has been cut from the continuous strip of material 105. This is accomplished in novel manner by a sheet-like guide member 150 having a top transverse portion 151 positioned opposite and parallel to the bottom of anvil plate 102b so as to form a relatively narrow, transverse open mouth 152 to freely receive a falling material blank 105b. The central portion 153 of guide member 150 may be smoothly curved about a selected radius so as change the path of a falling blank 105b to a horizontal path at horizontally disposed edge margin 154. Spaced guide strips 155 define on the inner face of the member 150 three parallel paths for the three discrete material blanks 105b. To further guide and maintain the separate paths of the material blanks, a pair of spaced guide wheels 157 carried on shaft 156 are aligned with guide strips 155.

The carrier means 34 may comprise a pair of endless chain means 158 interconnected transversely by a plurality of longitudinally spaced slats 159. Each slat 159 may be made of a firm, tough material, such as a rigid plastic, wood, or other suitable material which, if inadvertently positioned over the die cavity of the press means, may be pressed without damage to the press means. Each slat 159 may be connected to opposite links of chain means 158 as by angle brackets 160 secured to a chain link and to the adjacent end of slat 159. The carrier means 34 is generally disposed above the horizontal path of travel of the blanks with slats 159 positionable in plane of such horizontal path for contact with the blanks 105b. Adjacent the curved guide member 150 sprockets 161 mounted on shaft 156 turn the carrier means about an arc approximately the radius of the curved central portion 153 of guide member 150. Thus, as the carrier means turns around sprockets 161, a slat 159 is positioned closely adjacent the inner surface of the guide member 150 so that the bottom leading edge of a discrete blank 105b will fall by gravity against the trailing rear edge 162 of a slat 159. The carrier means 34 is intermittently actuated in timed relation to the cut-off means so that a slat 159 receives, catches and holds each material blank 105b for travel along the curved guide members.

The carrier means 34 then travels horizontally along a tile deck 164 of open framework. Deck 164 may comprise a pair of spaced parallel longitudinally extending side rails 165 having a plurality of longitudinally spaced cross members 166 secured in suitable manner to side rails 165. The cross members 166 support longitudinally extending relatively wide support members 167 which may carry extensions of narrower guide strips 155. Support members 167 project sidewardly beyond strips 155 and support longitudinally extending edge portions of material blanks 105b, as best indicated in FIGS. 8 and 10 at 168. To facilitate maintenance of proper alignment of the carrier means with deck 164 each slat 159 may be provided on its bottom surface with spaced longitudinal recesses 169 adapted to loosely receive and slide over strips 155. A material blank 105b may have a length less than the spacing of slats 159 so that a blank 105 is received and carried in an opening defined by slats 159 and strips 155.

On deck 164 blank 105b normally seats against the leading edge of a trailing slat 159.

Tile deck 164 is thus of relatively open construction with longitudinally extending spaces 170 through which broken or damaged blanks 105b, dust, or other debris may fall into a scrap sump therebelow for collection and removal by scrap screw conveyor 80.

The horizontal portion of carrier means 34 disposed along tile deck 164 intermittently feeds the material blanks to press 35. Immediately after passing through press 35, carrier means 34 is guided upwardly by turning about sprockets 172, 173, 174 to an enlarged driven sprocket 175. The carrier means continues upwardly at 176 for passage over idle sprocket wheels 177 and 178 at the top of press 35. The carrier means then descends as at 179 and is guided about sprocket 180 for timed intermittent advancement over the top of sprockets 161 into the material blank receiving position as herinabove described. Carrier means 34 has little tendency to accumulate dust and other foreign matter which would interfere with transport of the material blanks, is self cleaning, and travels through a major portion of its length above and away from the deck 164 and the press bed.

Means for adjusting the tension of the carrier means 34 may include mounting sprockets 178 on shaft 181 mounted in housings 182 carried by vertically adjustably movable slide members 183 slidably guided on upstanding vertical members 184 carried by press means 35. An elongated endless adjustment chain 185 passes over a top sheave 186 carried by shaft 186a which when turned drives through suitable gearing feed screws 187 threadedly engaged with housings 182 to raise or lower shaft 181. The lower loop of adjustment chain 185 is readily reached by an operator to modify the height of sprocket wheels 178 and thus modify tension or slack in the carrier means 34.

It should be noted that at the operational rate of intermittent motion of carrier means 34, each material blank 105b is oriented and registered with its trailing edge in contact with the leading edge of a slat 159, side edges of the blank slidably guidably contact ribs 155, and the blank spans the longitudinal slots 170 in the tile deck. Since the bottom face of the blank later becomes the top decorated face of a tile, scratching of such face is thus avoided. The supported side edge margins of the blank become scrap after pressing.

PRESS MEANS

Punch pressing of material blanks 105b is best shown in FIGS. 2 and 11–17, inclusive. Punch press 35 may comprise a fixed press bed 200 provided with a bolster plate. Die shoe plate 201 has upstanding guide posts 202 at each corner. A stationary die case plate 203 may be supported by guide posts 202 and has a top surface 204 which lies in the same horizontal plane as top deck 164 to smoothly receive material blanks 105b from deck 164. Guide strips 155a on top surface 204 are aligned with guide strips 155 on the tile deck and cooperate with slats 159 of the carrier means while blanks 105b advance across surface 204.

At the press station, the intermittently actuated carrier means positions a blank 105b over a bottom die cavity 206, three of such cavities being provided in transverse aligned relation. Extending upwardly into each die cavity 206 is a bottom die block 207 having a removable bottom die wear plate 207a and which may be secured as by bolts 208 to a bottom movable die plate 209. Bottom die plate 209 is vertically slidably mounted on guide posts 202 through slide bearing sleeves 210. Bottom die plate 209 carries a removable bottom wear plate 211 seated on a resilient means 212 retained on press shoe plate 201. Resilient means 212 serves to return bottom die plate 209 to its normal upper position with the top face of each wear plate 207a flush with top surface 204. Upward positioning of pad 209 is limited by a plurality of adjustable stop bolts 214 carried on pad 209 and abutting at 215 the bottom surface of die stops 216 carried by the stationary die case plate 203.

Downward travel of bottom die pad 209 is limited by metal blocks 217 carried by shoe plate 201 in alignment beneath each die cavity 206 and having a top finished abutment surface 218 contacted by bottom plate 211 of bottom die plate 209 when resilient means 212 is fully compressed.

Resilient means 212 may be of rectangular shape and provided with spaced thru openings 219 which accommodate the blocks 217. Resilient means 212 may be made of an elastomeric resilient flexible material such as polyurethane foam and comprises a plurality of lamina or slabs adhesively secured together in vertical stacked relation with reinforcing fabric interposed between said slabs. Such a laminated pad has been found to maintain desirable force-deformation characteristics over long periods of repetitive cycling without break down of the material and maintains top finished abutment surface 218 in a dust-free environment.

Press means 35 also includes a reciprocally movable top die plate 220 slidable on guide posts 202 which extend into bearing sleeves 221 carried in aligned bores 222 provided in top plate 220. Top die plate 220 carries a plurality of laterally spaced top die blocks 223 secured thereto as by bolts 224. Each die block 223 has a die face 225 on wear plate 223a aligned with and only slightly smaller in cross-section than the opposed die cavity 206. The top die plate 220 is bolted to press slide 226 which is reciprocally vertically movable by well-known means.

Between guide posts 202 on each side of the press bed a push rod 228 may be carried by the top movable die plate 220. The bottom end of push rod 228 extends into a seal bearing 229 carried at the upper end of an aligned through bore 230 provided in stationary bottom die case plate 203. Aligned with each bore 230 is an upstanding pin 231 carried by a piston 232 provided in a cylinder 233 in the bottom movable die plate 209. The bottom end of cylinder 233 communicates with a hydraulic line 234 for maintaining selected preload pressure on piston 232.

In operatiton of press means 35, downward movement of press slide 226 will cause downward movement of top die plate 220. When top die wear plate 223a reaches a position spaced just above a positioned material blank, push rods 228 engage upstanding pins 231 causing movable die plate 209 to move downward in phase with the top die plate 220. In this manner, blank 105b is loosely sandwiched between top die wear plate 223a and bottom die wear plate 207a and prevents crushing of the blank against the top plate because of the resisting force of resilient means 212. The blank 105b is sheared in this sandwiched position as it is forced into die cavity 206. The downward motion of the sandwich arrangement continues until bottom wear plate 211 contacts top finished abutment surface 218 of metal blocks 217. Previous longitudinal adjustment of push rods 228 and well-known top slide positioning means on press means 35 assures that this contact is made, for example, 0.025 inch above the bottom of the press means stroke.

As the top slide 226 continues its downward motion, pressure is exerted on upstanding pins 231 by push rods 228. At a certain pre-set force, fluid pressure under piston 232 is exceeded and fluid is forced from the bottom of cylinder 233 allowing piston 232 to retract into the cylinder means and retracting rigidly attached pin 231. Top die plate 220 is thus allowed to continue its movement to the bottom of the press stroke while the motion of bottom die plate 209 is stopped about 0.025 inch above the bottom of the stroke. Pressure exerted by wear plate 223a against the sandwiched material blank causes it to deform under such pressure to completely fill die cavity 206 which forms the spacing lugs, smooth edges, and bottom pattern of the tile. In such pressing operation, material blank 105b which may have a thickness of approximately .300 inch, is further compressed by overtravel of the top slide of the punch press to a thickness of .275–.280 inch or other selected thickness.

As shown in FIGS. 15, 16 and 17, each material blank 105b includes peripheral edge margins 105s which extend around cavity 206 and which are cut from the pressed tile body by the punch press operation and which become scrap flashing. Means for holding such scrap flashing against top surface 204 upon withdrawal of the top die block may comprise pairs of air actuated hold down devices 240 mounted on front and back faces of each top die block 223. Each device 240 may include a downwardly extending pressure foot 241 normally spaced just about the bottom surface of top die block 223. When the top die block 223 enters bottom cavity 206, each pressure foot 241 bears against the scrap flashing to hold the flashing against surface 204. When the top die block 223 moves upwardly, pressure feet 241 maintain pressure on the scrap flashing to prevent lifting of the flashing from surface 204. When the pressed tile body 105p is located at top surface 204, the pressure feet 241 disengage from the scrap flashing so that the slats 159 of the carrier means may advance both the pressed tile body 105p and the scrap flashings forwardly to the next stop position of the carrier means.

Means for separating the scrap flashing from the pressed tile body may be located on the discharge side of the press means 35. With reference to FIGS. 11 and 14, the next intermittent stop of carrier means after punch pressing will position the pressed tile body and scrap flashing at the edge of the press surface 204 and upon the surface 242 of a transversely extending scrap disposal plate 243 having a continuous transverse opening 246 defined by forwardly extending portitons 244 spaced from opposed rearwardly extending portitons 245, said portions 244 and 245 having approximately the same width as the pressed tile body. Scrap flashing on sides of the tile body are thus unsupported when the tile body is positioned on portions 244 and 245 and will fall into the scrap sump therebelow.

Means for momentarily holding the pressed tile body on portions 244 and 245 may comprise a transversely extending mounting bar 248 supported at its ends by side members 249 which may be pivotally mounted at 250 to adjacent frame members about an axis forwardly of bar 248. Above each tile body path, bar 248 may support a trailing pair of wheels 252 carried by yoke 253 supported at the trailing end of a longitudinal member 254 through a vertical pin and slot connection 255 to permit vertical movement of wheels 252. Thus trailing wheels 252 may contact leading and trailing scrap flashing from a tile body and will ride over slats 159 as the carrier means advances the pressed tile bodies. The rolling pressure of wheels 252 upon the leading scrap flashing causes it to break loose from the pressed tile body and to fall through opening 246 between portions 244 and 245. Likewise the trailing scrap flashing, when contacted by wheels 252 as the pressed tile body is advanced across the opening 246, breaks off and falls through opening 246.

The pressed tile bodies at their next intermittent stopped position are held on the rearwardly extending portions 245 by similar pair of wheels 256 carried at the leading end of member 254, The next incremental motion of the carrier means advances a pressed tile body across the forward portion of plate 243 where the leading edge portion of the pressed tile body is contacted and rapidly advanced by endless belt means 260 of a fettling conveyor means 261. At this point the transfer chain conveyor means leaves the horizontal path of the tile bodies and ascends the back portion of the tile press as heretofore described.

Means for cleaning the surfaces of the pressed tile bodies after leaving the punch press and for assisting separation of the scrap flashings from a pressed tile body may include a transversely extending air pipe 263 carried by a plurality of transversely spaced arms 264 secured to transverse bar 248. Air pipe 263 is provided with downwardly directed nozzles 265 which direct a stream of pressure air toward opening 246 and against portions of a tile body passing therebeneath. The pressure air is intermittently ejected in timed relation with the press operation so that the effect of a continuous stream of air is avoided, such effect tending to lift or cause floating of the pressed tile bodies on portions 244 and 245 and possibly resulting in misalignment of the tile bodies or improper contact of said bodies with a slat 159.

TIMING AND INTERLOCK MEANS

Means for correlating in timed relation the actuation of press means 35, carrier means 34, and the cut-off means 33 is best shown in FIGS. 3, 4, and 21. Punch press means 35 may be operated at a selected number of strokes per minute by well-known drive means. Main drive shaft 270 of the press means carries a gear 271 engaged by an endless chain 272 which drives a top gear 273 carried on a timing shaft 274 which is driven in direct relation to the main shaft 270 of the press means. Timing shaft 274 may be enclosed within a housing 275 and carries therewithin a plurality of disc-type timing cams 276, 277 and 278.

In this example, timing cam 276 may control actuation of the cut-off means 33 by contacting and closing a normally open switch 280 to energize the cut-off means 33. Cam 276 is adjusted on the timing shaft 274 with a slight time lead with respect to the press cycle so that the cut-off blades will strike the continuous strip of material at approximately the bottom stroke of the press die.

Timing cam 277 is correlated to the movement of the bottom die plate 209 and contacts and closes a normally open switch 282 which is interlocked as shown in FIG. 21 with a die return limit switch 283 mounted on the press means so that it is normally closed when the bottom die pad has fully returned after a pressing cycle. If the bottom die pad does not return to proper position and the switch means 283 is open, the press means, slat carrier means and cut-off means are de-energized and the operation stops. This interlock is provided so that damage will not occur to the press in the event the bottom die pad does not return to proper position and a second material blank is positioned over the die cavity.

Timing cam 278 correlates the timing of the slat carrier means and contacts a normally closed switch means 285 which is interlocked with a pin switch means 286 carried at one side of the tile deck for engagement with index pins 287 extending outwardly from chain means 158 approximately mid-way between slats 159. Carrier means 34 is driven by drive sprockets 175 carried by carrier drive shaft 289 which is connected to a torque control device 290 connected through a normally engaged clutch 291 to an indexing cam drive means 293 which is connected to the main press shaft extension 270 so that the carrier drive shaft 289 is in direct connection with and duplicates the cycling of the main press shaft 270. The carrier means 34 is indexed with respect to the cycling of the press so that the carrier means 34 will be stopped during cycling of the press shaft between 90 to 270° when the press die is in bottom position and will be moved after the top die block has cleared the press surface 204 and during cycling of the press shaft from 270 to 90°.

Normally closed switch means 285 is opened by timing cam 278 at a point in the cycling of the press and carrier shafts when the slat conveyor should be properly positioned with respect to the die cavity 206. At this moment pin 287 on the slat carrier means must contact switch means 286 on the tile deck to complete the circuit and to continue the press cycle. If pin 287 is not contacted by switch means 286 then the slat carrier means is out of proper indexing position with respect to the die cavity and the entire press, intermittent movement of the carrier means and cut-off means, will be stopped.

Torque control means 290 carried by the carrier means drive shaft 289 includes a pin 295 which will be urged radially outwardly in the event there is torque overload on the carrier means for contact with a normally closed limit switch 296 which when opened will cause shut down of the entire machine.

A further safety feature may be provided by a transversely extending pivotally mounted drop member 298 carried by the press body at the entrance to the press means and spaced just sufficiently above the end of the tile deck to intercept any foreign article or tool which might inadvertently be advanced by the carrier means toward the press means. Contact of such unwanted foreign article by the transverse member 298 will cause movement thereof which will contact a switch means 299 which is normally closed and which when opened will stop the entire machine.

As heretofore mentioned a switch means 300 mounted on the side of the press means may be contacted at the bottom portion of the down stroke of the top die pad so as to actuate and open a pressure air valve controlling the air supply to the air pipe 263 so that at the bottom of the press stroke and while the pressed tile bodies are stationary at the discharge side of the press a stream of air may be directed against the tile body to further clean surfaces thereof and to assist in the breaking away of the scrap flashing. The switch means 300 actuated by each down stroke of the top press die may also be connected to a counter for recording the number of strokes of the die and the number of tile produced.

It will thus be apparent from the above description of the timing means and switch interlock means that the press means 35 may be operated at selected rapid speeds and be protected from possible damage in the event indexing of the carrier means is not proper, or for some reason the carrier means is subjected to stoppage which will impose an undue torque load on the torque control means and thus cause complete stopping of the entire machine. It may also be noted that the indexing of the slat carrier means 34 is correlated with the cut-off means and the speed of fall of the separate discrete material blank severed from the continuously moving strip of material discharged from the roll means. Thus the present invention discloses a novel construction and arrangement for correlating and coordinating the movement of a continuous coherent strip of material through stages of cutting blanks from such continuous strip and moving the blanks in a novel manner to a press means for pressing a ceramic article therefrom. It may also be noted that as the blanks are intermittently moved along the tile deck toward the press means, suitable brush means (not shown) may be mounted from the tile deck for sweeping and cleaning the top surfaces of the material blanks.

Preparation of the granulated composition material from which the continouus rolled strip is formed may be modified depending upon the ingredients employed in the pre-mixed material. It has been found desirable that the hardness of the compacted body formed by the rolls prior to granulation should be in the order of 50–60 Shore "B–2." As mentioned above, the hardness of the rolled continuous coherent strip 105 should be between 45–55 Shore "B–2." The pressed tile body which is discharged from the press means may have a Shore "B–2" hardness of between 55–65 and have a bulk density between 2.14 to to 2.20. It is important to note that the condition and characteristics of the continuous strip 105 depends upon the proper granulation of the pre-mixed material with the pre-selected hardness indicated above and the range of particle size. It should also be noted that air is eliminated from the composition material by the tamping bars at the compactor means, and by the strip forming rolls so that the condition of the material blank at the press means requires virtually no further elimination of air from the material except that occurring during the press operation.

Other mixtures of ceramic composition material may be used, it being understood that with respect to hardness, density, and other characteristics, some modification may be made in moisture content, granulation, particle size and range for such other materials. It may also be desirable to include bonding agents and plasticizers to modify homogeneity, rollability and pressability of the material.

Size and shape of the pressed body may be varied, it being important that the portion of the material blank positioned over the die cavity have virtually uniform density, hardness, and thickness. The excess edge material of the blank, which may include slight edge hardness caused by rolling and irregular front and back edges, caused by cut-off means, does not become part of the pressed tile body and is almost immediately effectively removed as scrap for return to the flow path of the material under preparation. The amount of excess material should be sufficient to support the blank along the tile deck and to present an interior material portion having uniform characteristics described above.

In this respect, it is important to note that the slat carrier means is intermittently movable through the press means and positively moves the pressed tile body and scrap from the press surface 204. Any tendency of the pressed body to cling to the surface of the bottom die plate 207a is positively overcome by the movement of a slat 159 thereacross. Moreover, the off bearing surfaces along which the pressed body slides away from the die cavity are relatively short; scratching of the surface of the tile body to be decorated is reduced to a minimum, and the tile body is quickly transferred to a fettling conveyor where relative movement between the tile body and its support does not occur.

The slat-type carrier means with its intermittent movement from the cut-off means through the press means provides a novel means for linking the continuous output of the strip forming rolls to the intermittent operation of the press. The strip forming rolls are driven by a variable speed drive with each shaft matched in speed and variation in the rate of speed of the continuous strip, in addition to a permissible variation in the length of the blank because of the spacing of the slats, provides an adjustment means to correlate such conversion of the continuously moving strip to the intermittently moving blanks.

It will be understood that the unitary assembly of the top and bottom die plates, stationary case plate, resilient means, guide posts and push rods may be readily removed from the press means for precise adjustment. The movable die plate may be equipped with heating means to heat the die blocks 207 to reduce sticking of the pressed tile body in the cavity and the stationary case plate may be equipped with a cooling system to maintain the case plate at desired temperatures.

The advantages of the above described method and apparatus for forming pressed tile bodies in a rapid continuous manner, and as part of an entire production line, capable of automatic control, where the tile flows as a continuous stream from the pre-mixed material to the forming of a continuous coherent strip of material, the cutting of such strip into blanks which are transported, pressed, fettled, dried and sprayed with a glazing composition will be readily understood by those skilled in the art.

Various modifications and changes in the method and apparatus which come within the spirit of this invention and which come within the scope of the appended claims are embraced thereby.

I claim:

1. In an apparatus for rapid continuous manufacture of pressed tile bodies of ceramic composition material, the combination of:

Means including roll means for forming one or more continuous coherent vertically downwardly traveling strips of ceramic composition material;

pressure and guide means for maintaining said strip in strip form during travel from said roll means;

cut-off means below said pressure and guide means for successively cutting said strip into separate discrete blanks of material during such downward travel;

intermittently movable carrier means for said blanks and having a carrier portion intercepting the downward path of travel of said blanks for catching a blank;

means for changing the vertical travel of said blanks into a horizontal path of travel while said blanks are retained by said carrier means;

and punch press means in said horizontal path of travel for pressing a tile body from each of said blanks as said blanks are intermittently advanced by said carrier means.

2. In an apparatus as stated in claim 1 wherein said carrier means includes a pair of endless chain means and transverse slats interconnecting said chain means and longitudinally spaced for containing a material blank therebetween during movement of said blanks in said horizontal path.

3. In an apparatus as stated in claim 1 including means for actuating said cut-off means and said intermittently movable carrier means in timed relation to said press means.

4. In an apparatus as stated in claim 1 wherein said press means includes reciprocally movable die block means, and means on each die block means for holding peripheral margins of said blank in the path of travel of the carrier means during pressing of a tile body from said material blanks.

5. In an apparatus as stated in claim 1 including means for collecting excess blank material resulting from pressing a tile body from said blanks and returning such excess material to the means for forming said continuous strip of ceramic composition material.

6. In an apparatus for manufacture of pressed articles of ceramic composition material, the provision of:

means forming a continuous homogeneous vertically downwardly moving strip of ceramic composition material having a width greater than the article to be formed;

cut-off means for cutting discrete material blanks from said downwardly moving strip, each blank having a length greater than the article to be formed;

means receiving said downwardly moving discrete blanks in separate relation and changing their direction of movement from said downward movement;

press means for pressing an article of a length and width less than the corresponding dimensions of the blank;

and means correlating continuous forming movement of said strip, said cut-off means, said discrete blank receiving means, and said press means.

7. In an apparatus as stated in claim 6 including means for intermittently advancing said blanks through said press means, said advancing means contacting and moving said pressed article and excess material from the press means.

8. In an apparatus as stated in claim 7 including means on the press means for holding said excess material for engagement by said advancing means during pressing.

9. A unitary removable press assembly for use in an apparatus for making pressed ceramic composition articles from blanks of coherent composition material, the provision of:

a stationary case plate having a planar surface and die cavities therein said planar surface supporting said blanks over said cavities;

a movable top die plate having top die blocks above said cavities;

a movable bottom die plate below said case plate and having die blocks extending into said cavities;

means resiliently biasing said bottom die plate upwardly;

and means retaining said plates and biasing means in assembly.

10. A press assembly as stated in claim 9 including means for adjusting spaced relationship of said top and bottom die plates whereby internal portions of a material blank are sheared from said blank upon entering said cavity while being moved into said cavity in an uncompressed condition between said top and bottom die blocks.

11. In an apparatus for manufacture of pressed articles of ceramic composition material, the provision of:

means forming a continuous homogenous vertically downwardly moving strip of ceramic composition material having a width greater than the article to be formed;

cut-off means for cutting material blanks from said strip, each blank having a length greater than the article to be formed;

press means for pressing an article of a length and width less than the corresponding dimensions of the blank;

means for intermittently advancing said blanks from said cut-off means to said press means and through said press means whereby the material of the blank including the pressed article and excess material is removed from the press means;

said intermittent advancing means including transverse members longitudinally spaced apart a distance greater than the length of a blank whereby blanks of selected limited variable length may be accepted and advanced by said advancing means.

12. In an apparatus for rapid continuous manufacture of pressed tile bodies of ceramic composition material, the combination of:

means including roll means for forming one or more continuous coherent downwardly traveling strips of ceramic composition material;

guide means for maintaining said strip in strip form during travel away from said roll means;

cut-off means below said guide means for successively cutting said strip into separate discrete blanks of material during such downward travel;

intermittently movable carrier means for said blanks intercepting the downward path of travel of said blanks and directing said travel toward a press zone; and punch press means at said press zone for pressing a tile body from each of said blanks as said blanks are intermittently advanced by said carrier means.

13. In an apparatus as stated in claim 12 wherein said guide means includes a backing means extending into proximity with said roll means;

and spaced pressure means for holding said strip in slidable engagement with said backing means.

14. An apparatus as stated in claim 12 including means on said punch press means for holding edge margins of a blank during pressing of a tile body therefrom.

15. An apparatus as stated in claim 12 including means for deairing said composition material before said blanks reach said press means.

16. An apparatus as stated in claim 15 wherein said means for deairing said composition material includes compactor means for said material before said strip is formed by said roll means.

17. An apparatus as stated in claim 12 including means for granulating said material and providing a particle size of selected density and hardness before feeding said material to said strip forming roll means.

18. A press assembly as stated in claim 9 including means on said movable top die plate for holding marginal portions of a material blank during a press operation.

References Cited

UNITED STATES PATENTS

| | | | |
|---|---|---|---|
| 2,758,336 | 8/1956 | Franssen | 25—21 X |
| 3,350,744 | 11/1967 | Sederlund et al. | 18—19 |
| 2,611,434 | 9/1952 | Mugler | 25—20 X |
| 3,098,261 | 7/1963 | Littley et al. | 18—16.5 |

J. SPENCER OVERHOLSER, Primary Examiner

M. O. SUTTON, Assistant Examiner

U.S. Cl. X.R.

25—21; 83—128